US010119748B2

(12) United States Patent
Gruidl et al.

(10) Patent No.: US 10,119,748 B2
(45) Date of Patent: Nov. 6, 2018

(54) VACUUM INSULATION BODY

(71) Applicants: Liebherr-Hausgeraete Lienz GmbH, Lienz (AT); Liebherr-Hausgeraete Ochsenhausen GmbH, Ochsenhausen (DE)

(72) Inventors: Thomas Gruidl, Oberdrauburg (AT); Jochen Hiemeyer, Karlstadt (DE); Martin Kerstner, Wuerzburg (DE); Michael Freitag, Wuerzburg (DE); Manfred Gradl, Oberdrauburg (AT)

(73) Assignees: Liebherr-Hausgeraete Lienz GmbH, Lienz (AT); Liebherr-Hausgeraete Ochsenhausen GmbH, Ochsenhausen (DE)

( * ) Notice: Subject to any disclaimer, the term of this patent is extended or adjusted under 35 U.S.C. 154(b) by 0 days.

(21) Appl. No.: 14/908,921

(22) PCT Filed: Jul. 31, 2014

(86) PCT No.: PCT/EP2014/002118
§ 371 (c)(1),
(2) Date: Jan. 29, 2016

(87) PCT Pub. No.: WO2015/014500
PCT Pub. Date: Feb. 5, 2015

(65) Prior Publication Data
US 2016/0178270 A1    Jun. 23, 2016

(30) Foreign Application Priority Data
Jul. 31, 2013 (DE) ............. 10 2013 012 796
Sep. 2, 2013 (DE) ............. 10 2013 014 614

(51) Int. Cl.
F25D 23/06 (2006.01)
F16L 59/06 (2006.01)

(52) U.S. Cl.
CPC ............ *F25D 23/065* (2013.01); *F16L 59/06* (2013.01); *F25D 23/06* (2013.01); *F25D 23/062* (2013.01); *F25D 2201/14* (2013.01)

(58) Field of Classification Search
CPC ...... F25D 23/065; F25D 23/062; F25D 23/06; F25D 2201/14; F16L 59/06; F16L 59/065; Y10T 428/231; B29C 45/1418; B29C 45/14491; B29C 45/14639
USPC .................................................. 264/261, 262
See application file for complete search history.

(56) References Cited

U.S. PATENT DOCUMENTS 5,512,345 A * 4/1996 Tsutsumi ............ F25D 23/063
220/592.27
5,900,299 A * 5/1999 Wynne ................ B29C 44/1266
156/257
6,138,433 A * 10/2000 Ridge ..................... B29C 51/36
52/311.1
7,956,124 B2 * 6/2011 Peng ..................... C08G 18/283
428/423.1
8,765,247 B2 * 7/2014 Park ........................ E04B 1/803
428/69
2006/0159436 A1 7/2006 Yuasa et al.
2006/0185711 A1 * 8/2006 Bang ....................... F25B 21/02
136/230
2009/0179541 A1 7/2009 Smith et al.
2010/0231109 A1 * 9/2010 Matzke ................. F16L 59/065
312/401
2011/0165367 A1 * 7/2011 Kojima ................... E04B 1/803
428/69
2011/0315783 A1 * 12/2011 Baker ....................... B01L 7/52
236/3
2012/0067499 A1 * 3/2012 Elbing ............... C08G 18/4812
156/60
2012/0196059 A1 * 8/2012 Fujimori ............... F16L 59/065
428/34.1
2012/0297813 A1 * 11/2012 Hanley ................. F25D 23/064
62/331
2013/0029082 A1 * 1/2013 Park ........................ E04B 1/803
428/69
2013/0214664 A1 * 8/2013 Yoon ..................... F16L 59/065
312/405
2014/0339241 A1 * 11/2014 Cresswell ............. B65D 88/741
220/592.27
2017/0368724 A1 * 12/2017 Mack ...................... B29C 43/18

FOREIGN PATENT DOCUMENTS

| CN | 1087417 C | 7/2002 |
| DE | 102 48 854 A1 | 4/2004 |
| DE | 20 2007 014 564 U1 | 1/2009 |
| JP | 2004-20149 A | 1/2004 |

(Continued)

OTHER PUBLICATIONS

Machine translation for JP 2004028349, Jan. 29, 2004, Natsuhara Yuji.*
International Search Report (PCT/ISA/210) issued in PCT Application No. PCT/EP2014/002118 dated Oct. 31, 2014, with English translation (four (4) pages).

(Continued)

*Primary Examiner* — Hiwot E Tefera
(74) *Attorney, Agent, or Firm* — Crowell & Moring LLP

(57) ABSTRACT

The present invention relates to a vacuum insulation body with at least one vacuum-tight film which surrounds a vacuum region with at least one supporting material arranged therein. At least one protective cover for protection of the film is provided, and a material leveling out film irregularities is included as well.

6 Claims, No Drawings

(56) References Cited

FOREIGN PATENT DOCUMENTS

| | | |
|---|---|---|
| JP | 2004-28349 A | 1/2004 |
| JP | 2005-76725 A | 3/2005 |

OTHER PUBLICATIONS

German-language Written Opinion (PCT/ISA/237) issued in PCT Application No. PCT/EP2014/002118 dated Oct. 31, 2014 (five (5) pages).

German Search Report issued in counterpart German Application No. 10 2013 014 614.3 dated Mar. 11, 2014, with partial English translation (ten (10) pages).

* cited by examiner

VACUUM INSULATION BODY

BACKGROUND OF THE INVENTION

The present invention relates to a vacuum insulation body with at least one vacuum-tight film which surrounds a vacuum region with at least one supporting material arranged therein and with at least one protective cover for the protection of said film.

From the prior art it is known to use vacuum insulation bodies in the form of panels, for example in refrigerators and/or freezers, which have the task to prevent a passage of heat from the surrounding atmosphere of the appliance into the cooled interior space as far as possible.

These vacuum insulation bodies usually consist of a vacuum-tight film which surrounds a supporting or filling material. This supporting material provides the vacuum insulation body with the required dimensional stability and prevents that the walls of the vacuum insulation body, i.e. the films, directly rest against each other after the generation of a vacuum.

This filling material for example can be a porous material or also a packed bed.

From the prior art, it is furthermore known to provide said film cover of the vacuum core or the vacuum insulation body with a protective cover or to protect the same against damages by a protective cover. This protective cover also can serve as surface of the vacuum insulation body and in this case must satisfy certain optical or also functional demands.

From the field of refrigerators and/or freezers it is known to use a sheet metal wall as protective cover. This sheet metal wall, which at the same time can serve as outer wall of the body or the door or some other closure element, represents a good protection against damages. One disadvantage, however, consists in that to achieve a smooth, optically high-quality surface it is required that irregularities of the vacuum insulation body must be avoided, as the same otherwise appear in the sheet metal and are visible there.

For example, film-wrapped vacuum insulation bodies with a powder core have minimal local density differences in the powder core, which due to the very high pressure of e.g. 10 t/m$^2$ acting on the film of the vacuum insulation body can lead to such irregularities.

When between the walls, i.e. between the inner wall and the outer wall of a refrigerator and/or freezer only one such vacuum insulation body and no further insulation materials, such as for example a foam fill, is provided, particularly high standards are to be applied as regards the avoidance of irregularities of the vacuum insulation body.

SUMMARY OF THE INVENTION

It therefore is the object underlying the present invention to develop a vacuum insulation body as mentioned above to the effect that the appearance of irregularities in particular on sheet metal walls of refrigerators and/or freezers is avoided effectively.

This object is solved by a vacuum insulation body with the features claimed. Accordingly, it is provided that on the film a material leveling out irregularities of the film is present and/or that in the region between the film and said protective cover a material leveling out irregularities between the film and the protective cover is provided at least in certain areas.

This material preferably is a curable or already cured material.

By applying or incorporating such material, irregularities on the outside of the film of the vacuum insulation body can be leveled out easily and effectively. This in turn leads to the fact that an adjoining sheet metal wall or the like satisfies high optical demands, as irregularities cannot be transmitted, since the same are leveled out by the above-mentioned material.

The material at the same time can form the protective cover for the protection of said vacuum film and protect the same against damages.

It also is conceivable that in the region between film and protective cover, such as a sheet metal wall of a refrigerator and/or freezer, a material leveling out irregularities between the film and the protective cover is present at least in certain areas.

As explained, the material preferably is a curable material or a material present in the cured condition. This material can form a hard plastic cover which at least is placed on the side of the vacuum insulation body on which irregularities are present. It also is conceivable that the protective cover surrounds the vacuum insulation body on all sides, i.e. around the entire circumference.

Preferably, curing of the hard plastic is effected at the insulation body. Irregularities thereby are concealed.

As already explained above, the material itself can form the protective cover or a part of the protective cover of the vacuum insulation body and protect the film of the vacuum insulation body against damages.

In a further aspect of the invention it is provided that the protective cover is formed by a sheet metal wall or by an outer wall of a refrigerator and/or freezer. In this case it is possible that between the film of the vacuum insulation body and the sheet metal wall, which in this case forms the protective cover, the material is incorporated, whereby irregularities of the film are leveled out and it is ensured that the sheet metal has no deformations, but is designed flat and thus satisfies high optical demands.

Preferably, the material by means of which the irregularities are leveled out is a plastic material and in particular a hard plastic cover. The same is applied in a fluid form, for example as cast resin, and then cures in the desired way.

In a preferred aspect of the invention it thus is provided that the material is cast resin.

Furthermore, it can be provided that the material is a material on the basis of an epoxy resin or on the basis of polyurethane.

DETAILED DESCRIPTION OF THE INVENTION

The actual layer thickness of the material can lie in the range of 1 cm or less and preferably in the range of 5 mm or less. It is sufficient when the layer thickness of the material is dimensioned such that in general a flat or smooth surface of the vacuum insulation body is obtained.

By a suitable choice of production parameters it is possible to produce a vacuum insulation body such that the irregularities only are present on one side of the vacuum insulation body. In this case it is sufficient to arrange the leveling material only on this side of the vacuum insulation body.

The present invention furthermore relates to a refrigerator and/or freezer with at least one inner wall defining the cooled interior space and with at least one outer wall spaced therefrom, wherein in the space between inner and outer wall at least one vacuum insulation body is located.

It is conceivable that apart from said vacuum insulation body no further heat insulation, such as a foam fill, is present. In particular in this case it is important that the leveling material is incorporated, so that irregularities of the vacuum insulation body itself cannot be transmitted to a sheet metal wall or the like and are visible there. The invention is of course not limited to such embodiments, but also comprises refrigerators and/or freezers in which a foam fill is present as heat insulation material.

The present invention thus relates to a film-wrapped vacuum insulation body in which at least in a partial region irregularities on the film surface are leveled out with a curing or cured material, wherein the cured material in the cured condition forms the protective cover of the vacuum insulation body.

The invention also comprises the case that a film-wrapped vacuum insulation body is provided, by which at least in a partial region irregularities on the film surface are leveled out, namely in that between the film cover of the vacuum insulation body and a system cover, such as a sheet metal, a thin layer of preferably few millimeters of cured or curable material is incorporated.

As explained above, the material is one which is fluid in the processing condition and then cures. Useful materials include plastics and in particular cast resins (materials on the basis of epoxy resins or polyurethane).

Further details and advantages of the invention will be explained in detail with reference to an exemplary embodiment described below:

The exemplary embodiment relates to a refrigerator and/or freezer with an outer wall which forms the outside of the body or the door or some other closure element as well as an inner wall which forms the inner container or the inside of the door.

Between the outer wall and the inner wall a vacuum insulation body is located, which consists of a supporting core and of a high-barrier film or vacuum-tight film surrounding the same, in which a vacuum exists.

Apart from said vacuum insulation body no further heat insulation is located between outer wall and inner wall.

As explained above, density differences in the core, which preferably is designed as packed bed, can lead to the fact that on the surface of the vacuum insulation body irregularities are present, which involve the risk that the same are visible on the outside of the housing, i.e. on the sheet metal jacket, or are transmitted to the same.

To avoid this phenomenon, it is provided that the film of the vacuum insulation body is coated or provided with a flowable plastic which is placed such that the irregularities of the uneven side of the vacuum insulation body are leveled out. This plastic or resin plastic still cures at the insulation body and forms a flat surface of the vacuum insulation body.

The plastic consists of a cast resin, for example on the basis of an epoxy resin. This protective cover made of resin adjoins the adjacent wall, for example the outer wall of a refrigerator and/or freezer.

Preferably, it is provided that between the outer skin of the refrigerator and/or freezer or the sheet-metal jacket and said protective cover no further insulation material, such as a foam fill, is located. The invention, however, also comprises the variant that apart from the at least one vacuum insulation body further heat-insulating materials, such as a foam fill, are used.

The invention claimed is:

1. A refrigerator and/or freezer comprising:
   at least one inner wall defining a cooled interior space,
   at least one outer wall spaced from the at least one inner wall, and
   at least one vacuum insulation body located in the space between the inner and outer walls, the vacuum insulation body comprising:
      at least one vacuum-tight film which surrounds a vacuum region, and
      at least one supporting material arranged in the vacuum region,
   wherein a protective cover for protection of said film is formed by the outer wall,
   wherein a layer of a plastic material is located between the film and the outer wall to level out irregularities between the film and the outer wall, whereby the plastic material between the film and the outer wall is applied in fluid form and curing of the plastic material is effected at the insulation body, and
   wherein the refrigerator and/or freezer does not comprise any foam insulation between the outer and inner walls.

2. The refrigerator and/or freezer according to claim 1, wherein the plastic material is a cast resin.

3. The refrigerator and/or freezer according to claim 1, wherein the plastic material includes an epoxy resin or polyurethane.

4. The refrigerator and/or freezer according to claim 1, wherein the layer thickness of the plastic material is below 5 mm.

5. The refrigerator and/or freezer according to claim 1, wherein the layer of the plastic material has a thickness of less than 1 cm.

6. A method of producing a refrigerator and/or freezer having at least one inner wall defining a cooled interior space, at least one outer wall spaced from the at least one inner wall, and at least one vacuum insulation body located in the space between the inner and outer walls, the vacuum insulation body comprising at least one vacuum-tight film which surrounds a vacuum region and which is protected by a protective cover formed by the outer wall, and at least one supporting material arranged in the vacuum region, the method comprising:
   applying a plastic material in fluid form between the film and the outer wall to provide a plastic material layer located between the film and the outer wall to level out irregularities between the film and the outer wall, and
   effecting curing of the plastic material applied in fluid form at the insulation body to produce the refrigerator and/or freezer without any foam insulation between the outer and inner walls.

* * * * *